United States Patent [19]

Schulze et al.

[11] 3,939,630
[45] Feb. 24, 1976

[54] CROP-FEED ARRANGEMENT FOR HAY BALER

[75] Inventors: Rudolf Schulze, Neustadt; Horst Schumacher, Langburkersdorf; Ferdinand Simora, Bonnewitz, all of Germany

[73] Assignee: VEB Kombinat Fortschritt Landmaschinen, Neustadt in Saxony, Germany

[22] Filed: Mar. 8, 1973

[21] Appl. No.: 339,185

[30] Foreign Application Priority Data
May 23, 1972 Germany.............................. 163124

[52] U.S. Cl.................................. 56/341; 198/107
[51] Int. Cl.²........................................ A01D 39/00
[58] Field of Search.......................... 56/341–343; 100/141–143, 107, 188 R, 189; 198/107, 86, 82, 84

[56] References Cited
UNITED STATES PATENTS

| | | | |
|---|---|---|---|
| 2,725,009 | 11/1955 | Bornzin | 100/189 |
| 2,909,887 | 10/1959 | Claas | 56/341 |
| 2,950,670 | 8/1960 | Nolt et al. | 100/142 |
| 2,950,807 | 8/1960 | McDuffie | 198/107 |
| 3,020,830 | 2/1962 | Harrington | 100/209 |
| 3,464,347 | 9/1969 | Morris | 100/189 |

FOREIGN PATENTS OR APPLICATIONS
226,532   3/1963   Austria .............................. 56/341

*Primary Examiner*—Russell R. Kinsey
*Attorney, Agent, or Firm*—Karl F. Ross; Herbert Dubno

[57] ABSTRACT

A crop-feed arrangement for a hay baler displaced along a swath is provided with a pickup drum whose tines elevate the crop material from the ground and dispose it in a trough extending transversely of the direction of advance of the baler. An auxiliary feed device is provided above the pickup drum and is angularly oscillatable, while being provided with independently elastically suspended pushers, for feeding the crop material into the trough in which a transverse-feed mechanism, e.g. a fork describing a kidney-shaped pattern of motion advances the crop material into the lateral opening of the press channel. The ram compacts the crop material in this channel which extends in the travel direction, whereupon the bale is tied and the finished bale ejected at the rearward end of the channel.

1 Claim, 2 Drawing Figures

CROP-FEED ARRANGEMENT FOR HAY BALER

FIELD OF THE INVENTION

The present invention relates to a crop-material feed arrangement for a baler and, more particularly, to a baler for crop materials, such as hay, having a pickup drum and a press channel extending transversely to one another.

BACKGROUND OF THE INVENTION

A hay baler or a baler for other crop materials generally comprises a vehicle structure or housing movable in a direction of advance along a swath of mown crop material which has previously been raked or tedded to form hay or which may be displaced across a field to pick up crop material such as straw discharged from a reaper, combine or the like.

Conventional hay balers may have a press channel extending in the direction of travel of the vehicle and provided with a ram or plunger adapted to compact crop material feed in this channel into a bale of a standard size. When the compacted material has reached this size, needles or other tying means knot a twine or wire about the compacted mass to form the bale which, as a further mass of crop material is advanced through the press channel, is ejected in the rearward discharge end of the channel. SInce the ram and tying mechanism operate substantially periodically or intermittently, a transverse-feed mechanism may be provided to introduce crop material into a lateral opening of the baling channel in a retracted position of the ram. After this mechanism has moved out of the path of the ram, the latter becomes effective to compact the freshly introduced crop material against the previously formed bale. The transverse-feed mechanism thus operates synchronously with, but in phase-shifted relationship to, the press ram and both may be provided with a common drive.

The transverse-feed mechanism may include a trough or the like extending transversely of the press channel and, therefore, generally transverse to the direction of movement of the baler travel direction and may be provided with a feed fork or the like describing an elliptical or kidney-shaped motion whereby the fork sweeps close to the bottom of the trough in the direction of the press channel, elevates its tined at the end of their travel ends to lift the crop material into the press channel through the aforementioned lateral opening and then retracts rearwardly at some distance above the floor of the trough so that crop material can continuously feed into the trough during the feed and return strokes of the mechanism.

OBJECTS OF THE INVENTION

It is the principal object of the present invention to provide an improved crop-feed mechanism for a hay baler whereby earlier disadvantages can be obviated.

It is still another object of the invention to provide a hay baler having an improved crop-feed mechanism which provides a high degree of pre-compaction and more efficient advance of crop material than has been obtained heretofore.

SUMMARY OF THE INVENTION

The foregoing objects and others which will become apparent hereinafter are attained, in accordance with the present invention, in a crop-feed arrangement for a hay baler displaceable along a swath of a field crop and which comprises, in addition to a pickup drum rotatable about an axis transverse to the direction of displacement of the body of the baler, an auxiliary feed device above the pickup drum which is angularly oscillatable for pushing the crop material into a transverse-feed trough and having a longer duty cycle (ratio of effective crop advance time to the period of oscillation or to the return time) and therefore a faster return time than feed time.

The basic baler structure may have the configuration described earlier, i.e. can include a housing or a chassis displaceable on wheels along the ground and towed by a tractor or other vehicle, although a self-propelled arrangement need not be excluded.

The chassis or housing is provided (preferably at one side) with a rearwardly extending press channel or baling chamber in which the ram or plunger of the baler is reciprocal by a drive means connected to a prime mover on the implement chassis (e.g. an engine) or to the power takeoff of the towing tractor, for compaction of crop material within this channel against a previously formed bale therewithin or against the retarding forces of friction between the crop material and the channel wall. The baling channel is generally provided, in addition, with baling needles or the like adapted to sling baling twine or wire around the bale during its formation and a knotting mechanism for tieing the cord or wire around the bale. The mechanism for slinging the twine or wire around the bale for knotting the ties and even the ram may be of conventional construction well known per se.

According to a feature of the invention, the press channel is provided with a lateral opening communicating with a transverse-feed trough which may extend the full width of the swath at the throat of the intake portion of the housing in which the pickup drum is disposed. The transverse-feed trough thus extends transversely (generally horizontally) to the direction of displacement of the implement and generally perpendicularly to the press channel, but parallel to the axis of the pickup drum. A transverse-feed mechanism, also known per se, may be displaceable along the feed trough to carry the gathered crop material into the press channel through the aforementioned opening. While any conventional transverse-feed mechanism, e.g. auger, belt or plunger, may be used for this purpose, it is preferred to employ a plurality of forks swingable in a circular or elliptical pattern of movement in a substantially vertical plane parallel to the axis of the pickup drum and perpendicular to the press channel for sweeping the crop material along the trough and lifting it into the press channel through the opening therein.

DESCRIPTION OF THE DRAWING

The above and other objects, features, and advantages will become apparent from the following description, reference being made to the accompanying drawing in which.

SPECIFIC DESCRIPTION

Figure 1:
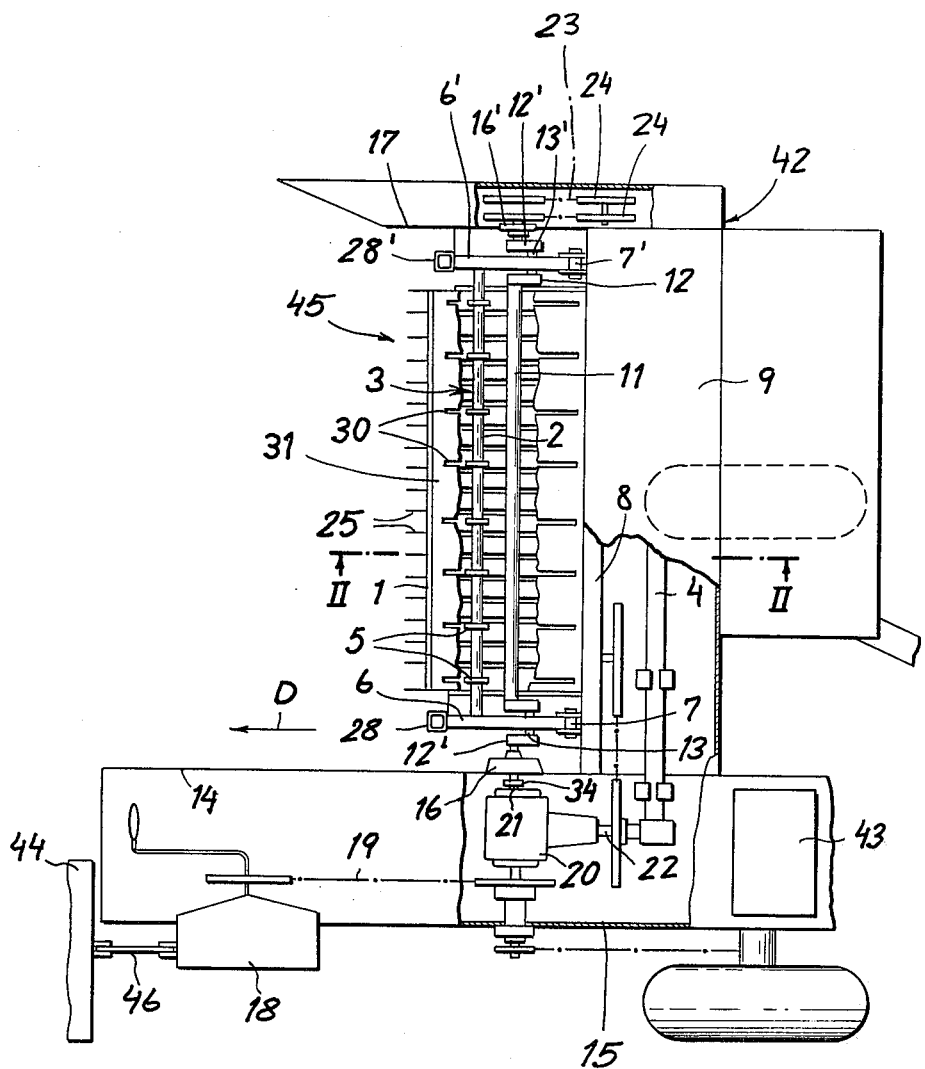
FIG. 1 is a top-plan view of a first embodiment of the apparatus according to the present invention.
Figure 2:
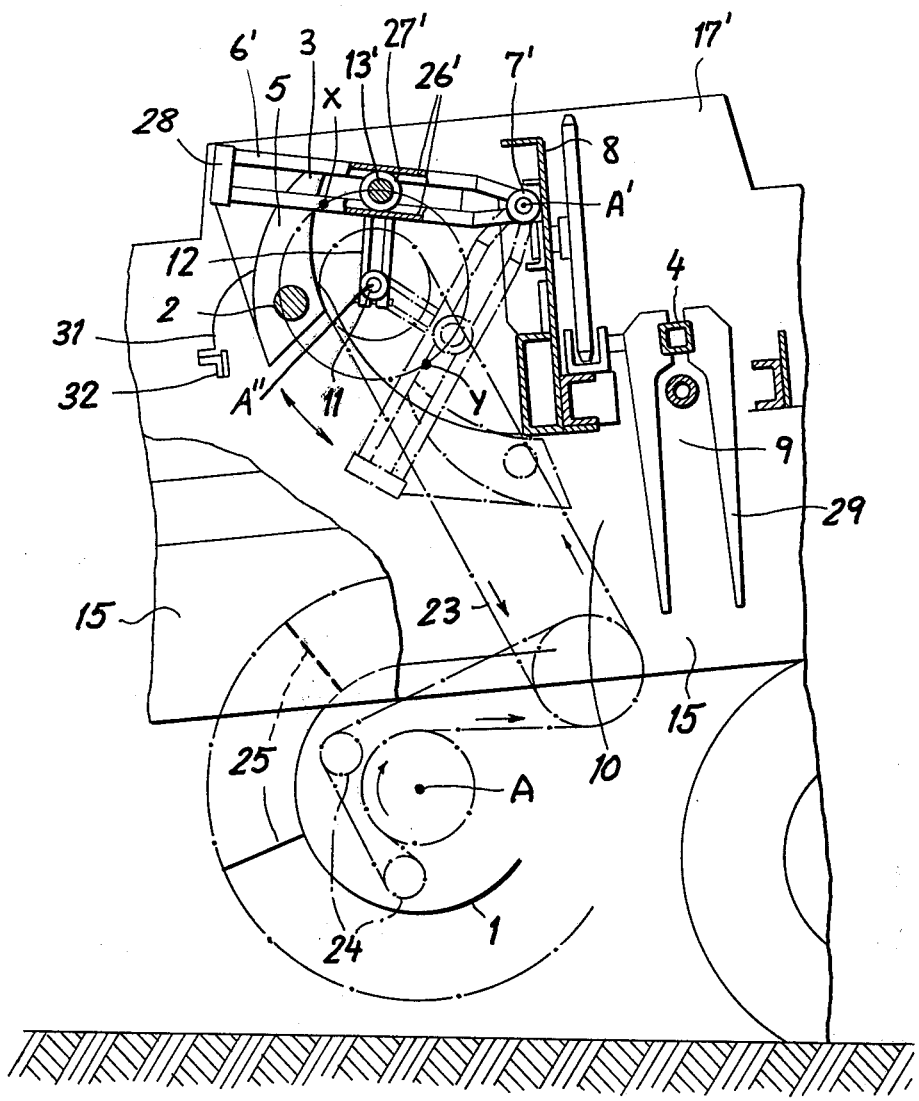
FIG. 2 is a side-sectional view taken along line II--II of FIG. 1, drawn to an enlarged scale.

As shown in FIGS. 1 and 2 the apparatus according to the present invention has a housing 42 adapted to ride along the ground behind a tractor 44 in a transport direction D. The housing has an outrigger arm 17 defining a forwardly open throat 45 in which a pickup drum 1 having tines 25 is rotatable about a transverse axis A (FIG. 2).

Above and in back of the drum 1 there is a pusher unit 3 which, as will be described below, picks crop material from between the tines 25 and pushes it back through an opening 10 into a transverse trough or channel 9 whose end opens into a baling chamber 15. A transverse feeder 4 in the trough 9 advances the crop into the chamber 15 where it is formed into tied-up bales by a mechanism 43 known per se and, therefore, shown diagramatically is a block. The transverse feed 4 comprises at least one fork (FIG. 2) having a plurality of teeth or tines 29 which describe a linear, elliptical, kidney-shaped or circular path in the lower arc of which they move toward the chamber 15 so as to push the crop in that direction (see U.S. Pat. NO. 3,351,002).

The pusher unit 3 comprises a plurality of equispaced sheet-metal blades 5 each having a hub through which a shaft 2 parallel to the drum axis passes. A shaft 11 also extends parallel to the axis A, and therefore lies perpendicular to the transport direction D and parallel to the trough 9. At each end the shaft 11 is provided with a crank arm 12 connected to another parallel crank arm 12' by respective pins 13 and 13' parallel to the shaft 12. At one end the arm 12' is pivoted in a bearing 16' in the wall of the outrigger arm 17 and at the other end in a bearing 16 in the wall 14 of the chamber 15.

The tractor 44 has a power takeoff 46 connected to a first transmission 18 connected in turn through a chain 19 to a second transmission 20 having a first output shaft 21 connected through the bearing 16 to one end of the crankshaft 11 and a second output shaft 22 that is coupled with the transverse feed 4. The other end of the shaft 11 is connected via chain 23 and drive wheels 24 to the drum 1 so as to rotate this element also, in a clockwise direction as shown in FIG. 2. The shaft 11 simultaneously is rotated in a counter-clockwise direction.

The crankpins 13 and 13' are removable and each carry a roller 27' which rides in a track 26' (FIG. 2) formed in respective arms 6 and 6' which are pivoted in respective bearings 7 and 7' about a common axis A' above and behind the shaft 11 and about directly above the opening 10. The ends of the arms 6 and 6' are closed by screwed-on endpieces 28 so that as the crank-shaft rotates these arms oscillate back and forth like a crankslide. The shaft 2 passes through the blades 5 and is connected to the arms 6, 6' so that, as these arms are oscillated, all of the blades 5 move in unison. The blades 5 may be resiliently mounted or provided with springs as described below. A plate 31 spanning the throat 45 is formed with a plurality of slots 30 in which the blades 5 are received so that these blades will be cleared of crop on their return (clockwise oscillation) stroke. A reinforcing member 32 at the under edge of the semicylindrical plate 31 protects this element from damage. The effective ends of the blades continuously protrude through the slots 30 of plate 31, which runs parallel to the path of the blades, serving to prevent entry of crop material into the blade drive mechanism.

As the apparatus is drawn along behind the tractor 44 the tines 25 of the drum 1 pick cut or piled crop up of the ground and carry it upwardly. The oscillating blades 5, which are phase shifted by about 180°with respect to fork 29, as they move from the solid line position of FIG. 2 to the dot-dash line position pick the crop out from between the tines or move at the speed thereof and assist in moving the crop material back toward the opening 10, hence into the channel 9. The teeth 29 entrain the crop along the channel and into the chamber 15 where it is formed into bales. Plate 31 is mounted upon the longitudinal support 8 for the transverse-feed mechanism and upon the frame member 32 of the housing.

Since the crankpins 13 and 13' lie between the axis A' and the pusher blades 5, these blades will be displaced more rapidly on their return stroke than on their working stroke. On counterclockwise rotation of pin 13 from point X to Y, the pin lies between the axis A'' of the shaft 11 and the axis A', so that the arm 6' is being operated as a third-class lever for the return stroke. As the pin rotates from point Y to point X, however, the lever arm is shorter, or the fulcrum is moved considerably toward the working end of the lever. Thus the arm 6' will move more slowly during the downward working stroke than during the upward return stroke, here only half as fast. In this manner, the crop is less likely to be damaged. The pushers 5 have the configurations of cornicopias with the base forming the active face and lying in a plane parallel to the axis A. In their lower dead center positions, the blades 5 have a height (seen in side view) which is approximately half that of the opening 10 and overlies half this opening. The tapered leading end projects in this position into trough 9 (see FIG. 2, dot-dash lines).

We claim:
1. A baling apparatus comprising:
a housing displaceable along the ground in a travel direction;
a pickup drum at the front of said housing and rotatable about an axis transverse to said direction;
means forming a channel in said housing extending transverse to said direction in back of said drum all along the latter;
means forming a baling chamber extending in said direction on said housing at one end of said channel and along a side of said drum;
drive means on said housing for rotating said drum and thereby lifting crop off the ground and displacing the crop back toward said channel;
an oscillatable shaft member on said housing extending transversely to said direction above said drum and said channel;
a plurality of pusher elements on said member displaceable from said drum to said channel;
torsion spring means between each element and said shaft member for yieldably resisting uneven displacement of each element relative to said shaft member;
eccentric means operable by said drive means and coupling means connecting said eccentric means to said member for oscillating said elements at a relatively slow rate to displace said crop from said drum into said channel and at a relatively rapid rate away from said channel;
a rod extending along said member and engageable with said elements for retaining same against the force of said spring means;
means in said channel and mounted on said housing for displacing crop therealong into said chamber;

and means in said chamber and mounted on said housing for forming bales of said crop.

* * * * *